Aug. 12, 1969  E. GUIGNARD  3,460,386
PROCESS AND A DEVICE FOR CHECKING A TANK FOR LEAKAGE
Filed March 23, 1967  4 Sheets-Sheet 1

INVENTOR
Edwin Guignard
BY
ATTORNEY

Aug. 12, 1969  E. GUIGNARD  3,460,386
PROCESS AND A DEVICE FOR CHECKING A TANK FOR LEAKAGE
Filed March 23, 1967  4 Sheets-Sheet 3

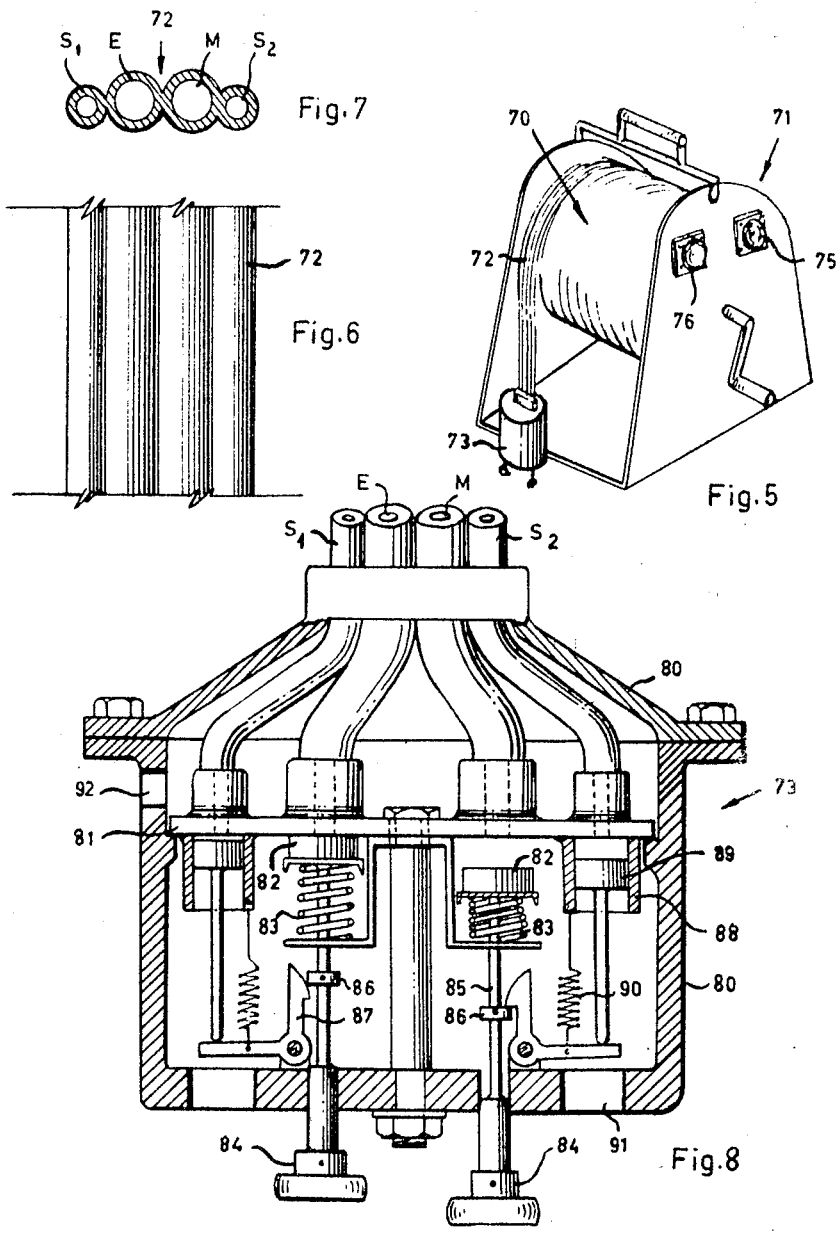

United States Patent Office 3,460,386
Patented Aug. 12, 1969

3,460,386
PROCESS AND A DEVICE FOR CHECKING A TANK FOR LEAKAGE
Edwin Guignard, Zurich, Switzerland, assignor to Igewa-A.G., Zurich, Switzerland
Filed Mar. 23, 1967, Ser. No. 625,552
Claims priority, application Switzerland, Mar. 29, 1966, 4,739/66
Int. Cl. G01f 23/06
U.S. Cl. 73—290    11 Claims

ABSTRACT OF THE DISCLOSURE

A process and device for checking fluid-storage tanks for leaks, employing two individually-closable tubes, fixed in parallel, side by side, in such a way that one tube holds the original level in the tank and the other shows, after the lapse of any desired time-interval, a drop in level due to a leak.

---

Processes for checking tanks containing a fluid for leakage by the measurement of the lowering of the fluid level in the tank are known per se. One measures, for example, by means of a measuring rod, whether and how much the fluid level has dropped within a certain time. In all the measuring methods based on this principle, the error inheres that take no account of the effects of temperature and therefore lead to false conclusions. If, for example, an underground tank is filled in summer from a tanker-wagon with relatively warm fuel oil, the oil cools to the soil temperature whereby it takes up a smaller volume, so that the level in the tank falls. A measurement by the process described above would point to a leak. If the above-described measuring method is improved upon nothing is thereby gained. If falls in level smaller than 1 mm. are indicated or measured, then naturally smaller temperature variations would also influence the accuracy of measurement. The invention provides a new method for leak-checking in which variations of temperature of the fluid during measurement play no part at all and do not influence the accuracy of measurement or indication.

The apparatus according to the invention is distinguished by the fact that two firmly-joined tubes running parallel to one another, a measuring tube and a calibration tube, are arranged to be inserted so far into the tank that at least their lower ends are fully immersed in the fluid and they are fixed in this position, whereupon the calibration tube, at least for the duration of measurement, is closed from below by means of a valve, while the measurement tube remains open from below, and finally at the end of the period of measurement, the measurement is carried out in such a way that, if a leak is present, a difference of the fluid level pointing thereto is determined or measured in the calibration and in the measuring tube, whereby variations of temperature during the period of measurement do not influence this measurement because the temperature of the fluid in both tubes agrees mutually and with the temperature of the fluid contained in the tank.

A variation of temperature during measurement or during leak-checking plays no part because the temperature of the fluid in the tank, in the calibration tube and in the measuring tube are always the same, quite independently of whether the fluid during the measurement is warmed or cooled.

The invention will now be described with reference to the accompanying drawings, which show an embodiment of the invention but in no restrictive sense.

Figure 1:
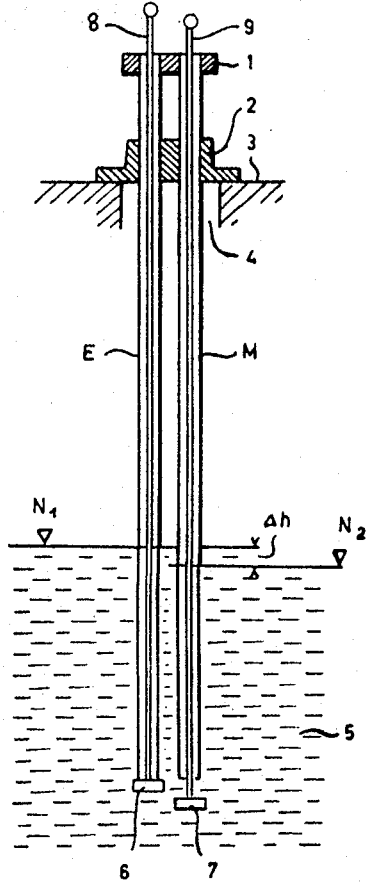
Figure 2:
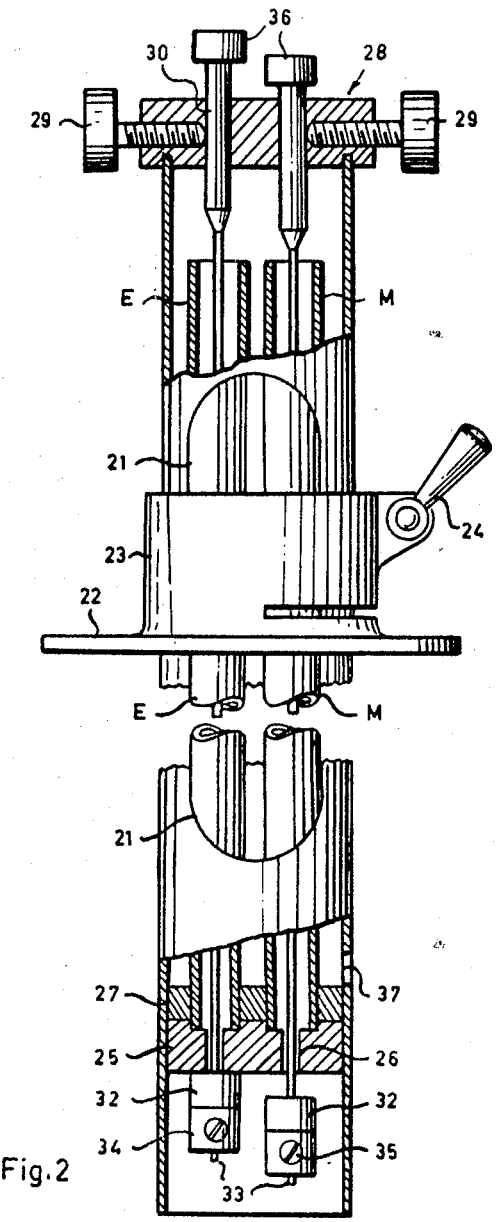
Figure 3:
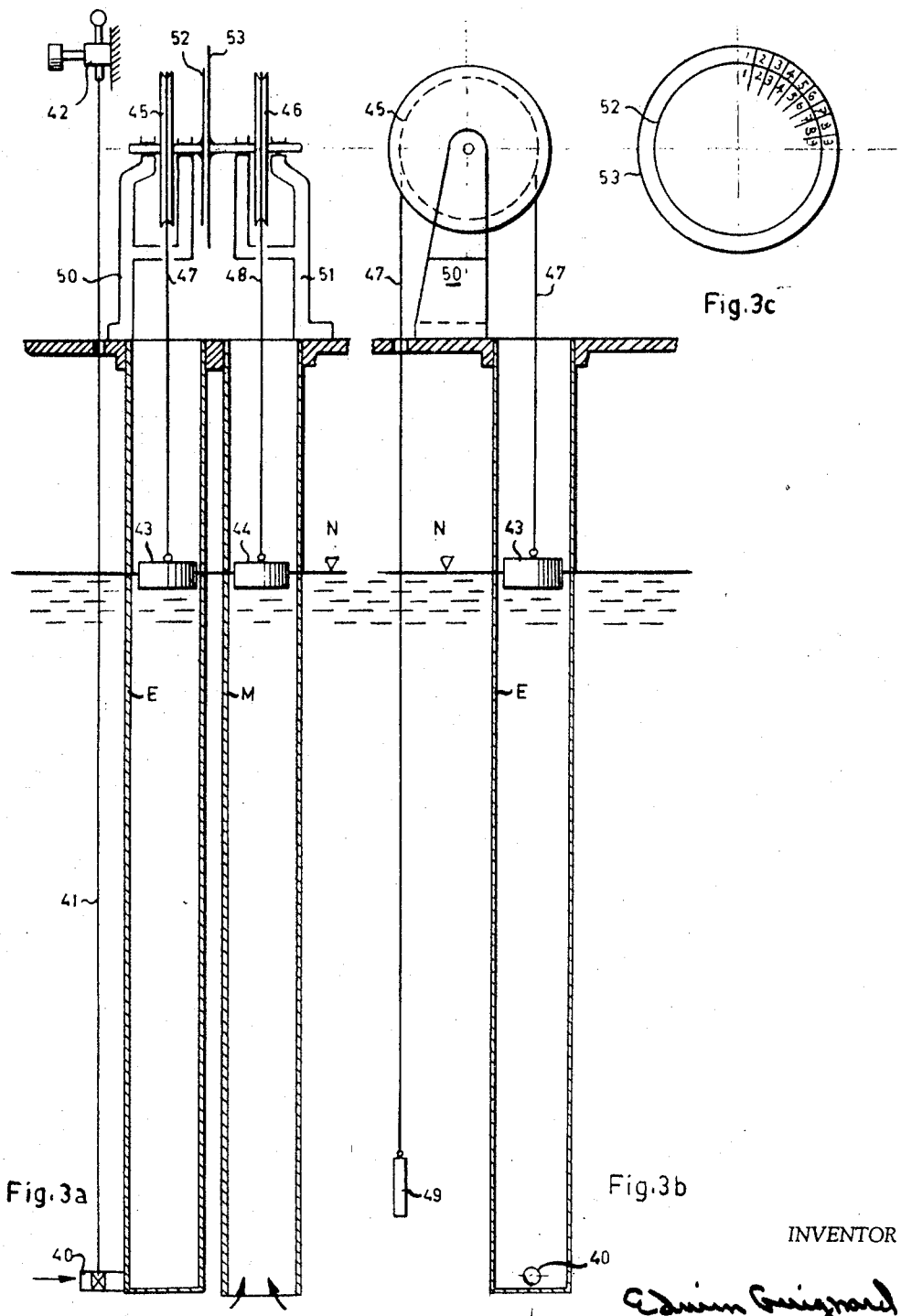
Figure 4:
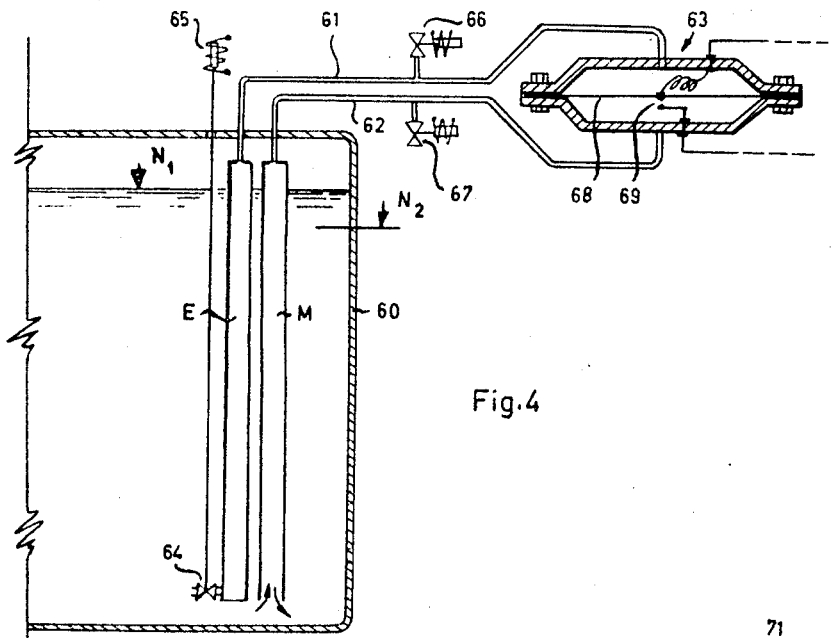

FIGURE 1 shows a schematic diagram for explaining the process;

FIGURE 2 a transportable leak-detector in partial section;

FIGURES 3a, b a diagrammatic representation of a leak-detector, permanently fitted in the tank, from the front and from the side;

FIGURE 3c a scale of the indicator device of the instrument according to FIGURES 3a, b;

FIGURE 4 a diagrammatic representation of a permanently fitted leak-detector with a pneumatic warning-device;

FIGURE 5 a transportable leak-detector for measurements or checks in a deep tank;

FIGURES 6 to 8 details of the detector according to FIGURE 5, and

Figure 9:
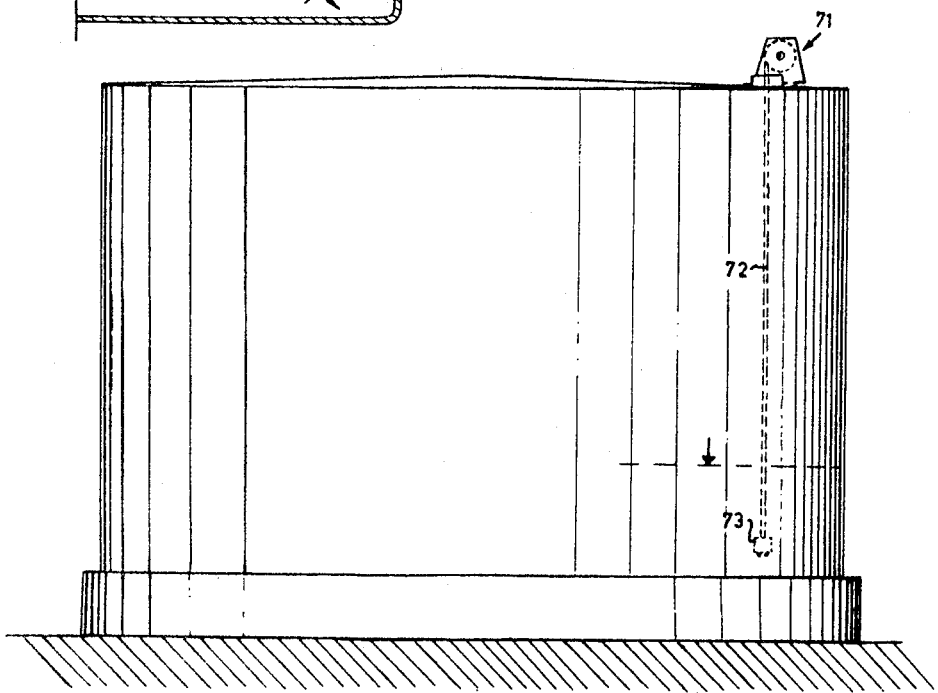

FIGURE 9 an instrument according to FIGURE 5 during a check-measurement.

By means of FIGURE 1, the new process may be described. Here, E represents a calibration tube and M a measuring tube. They are firmly joined together by means of a joining piece 1, and held in a flange 2. This rests on a fixed part of a tank, for example its cover, and the two tubes E and M are inserted through an opening 4 in the leak-suspect tank, and dip into the fluid 5. Both tubes are independently closable from below by means of a valve 6 or 7. The valves can be actuated (opened or closed) from above on the tube by means of a pull-rod 8 or 9. The check for leakage now takes place in such a way that both tubes with opened valves 6, 7 are first inserted in the tank. The insertion-depth is adjustable by shifting the flange 2. They should dip well into the fluid, in each case so far that the lower ends, even during a drop in the level, remain in the fluid. The valve 6 of the calibration tube E is now closed by means of the pull-rod 8. The fluid level at the beginning of the measurement is thereby fixed in the calibration tube. In the example shown, this is the level $N_1$. The time of measurement amounts to 8 hours; in this time, the level, in consequence of a leak in the tank, has fallen to $N_2$. At the end of the measuring period, that is after 8 hours, the valve 7 is also closed, by means of the pull-rod 9, and the device, together with the flange 2, is withdrawn from the tank. If the tubes E and M are glass tubes, for example then the difference of level $\Delta h$ can be determined immediately and one can thereby come to a conclusion about a leak. To put the case, as described in the introduction, that the fluid in the tank is cooled during the measurement, then the level sinks in consequence. But since the calibrating tube and the fluid contained therein is equally strongly cooled, the levels in the calibration tube and in the tank always remain at the same height. Only when, in consequence of a leak in the tank, the level drops further than would be caused by the cooling alone, the level in the tank falls below the level in the calibration tube and that level is of course measured in the measuring tube. No false reading thus arises. Events take place in the opposite sense if the temperature rises during the measurement; even then, there is no false reading.

A prerequisite for a reliable leakage-check is naturally that during the duration of the check, fluid is not taken from the tank in another way.

FIGURE 2 shows an instrument, the operation of which was shown by means of the diagram in FIGURE 1. E and M are respectively a calibration and a measuring tube, made of glass. They are located in a protective tube 20 which is provided with a slit-shaped sight-opening 21. The protective tube is held in a flange 22, adjustable in a collar 23. It can be set and fixed at the desired immersion-depth by means of a clamp 24. In the bottom of the protective tube is fitted a plate 25 with two bores 26, countersunk on one side, and adjoining and centrally thereto the tubes E and M are secured. By means of a gasket 27, they are sealed off mutually and in connexion with the bores 26. 37 is a drain-opening for the protective tube. At the top of the protective tube is a head 28 with two set-screws 29, and two bores 30, aligned on the tubes E and M. Below the plate 25 are two valves which, by means of valve-discs 32, made of synthetic rubber, can be closed against the underside of the plate. This is done by a wire 33 which is held in the valve-body 34 by means of a screw 35. At the upper end, the wires 33 are each secured in a knob 36, passing through the bores 30. By means of these knobs 36 and the clamping-screws 29, the valves may be opened or closed by hand from the upper end of the device at will. In the checking of a tank suspected of a leak, one proceeds as follows:

(1) One inserts the device with the valves open into the tank until the lower end thereof is deeply immersed in the fluid;

(2) One fixes the flange 22 in this position by means of the clamp 24;

(3) One closes the valve of the calibration tube E for which one pulls up the left knob 36 and fixes in this position by means of the clamping screw 29.

(4) During the measurement period the device must not be removed from the tank. After the expiration of the measurement period, for example after 8 hours, or, depending on the reliability of the tank, after a longer period, one closes the valve of the measuring tube M, for which one pulls up the right knob 36 and fixes it in this position by means of the clamping screw 29.

(5) The device can now be lifted from the tank and the level in the tubes E and M can be compared with one another. If the level in tube M is lower than in tube E, this points to a leak.

Thus a portable instrument is involved here. But one can also install permanently in a tank a device which works on the same principle.

FIGURES 3a–c show in a simplified representation such a permanently fitted leak-detector with an indicator device. Instead of reading off the difference of level on the withdrawn instrument, it must now be shown and read off while both tubes, the calibration and the measuring tube, remain in the tank. A simple means thereto is to arrange a float in each tube, the situation of which can be determined outside the tank. The tubes now no longer need to be made of transparent material. In FIGURES 3a–c, E is a calibration tube and M a measuring tube. The measuring tube is open at the bottom, the calibration tube, on the other hand, is provided with a valve 40 which can be opened or closed from outside by means of a draw-wire 41 and an actuating device 42. In the tubes E and M are floats 43 or 44 which are provided with a draw-wire 47, 48 running over a pulley 45 or 46, and each with a counterweight 49. The pulleys 45, 46 are mounted individually rotatable in bearing blocks 50, 51 and drive indicator-discs 52, 53. These discs move past one another without touching and are each provided with a scale (v. FIGURE 3c).

If it is desired to check for leakage the tank in which such a device is fitted, then during the checking period no withdrawal must take place. One proceeds as follows:

(1) One opens valve 40 until the level in the calibrating tube E has been set at the level in the tank, then closes it.

(2) After the expiration of the checking time, the scales 52 and 53 are read off, which now show whether the level in the two tubes is still at the same height. If the tank is leaking, the level in the measuring tube is lower than in the calibration tube.

In such an arrangement, the level of the float in the measuring tube naturally gives the level in the tank, so that the scale can be calibrated to correspond with the capacity of the tank.

FIGURE 4 shows an arrangement similar to that in FIGURE 3a to c, but in which no floats are used, but the difference of level operates an alarm device pneumatically. In this drawing, 60 is a tank with a permanently fitted calibration tube E and a permanently fitted measuring tube M. Both tubes are closed above and are connected by means of pipelines 61 and 62 with a diaphragm-capsule 63. The calibration tube E is provided below with a valve 64 which can be opened or closed by means of an electromagnet 65. The measuring tube, on the contrary, is open below as the arrows indicate. The pipelines 61, 62 are provided with electromagnetically-operable venting-valves 66, 67. The diaphragm-capsule 63 is hermetically sealed and contains a diaphragm 68 arranged in its casing, which is connected with a contact system 69 in which one contact moves with the diaphragm, the other contact, on the contrary, is arranged immovably in the casing.

Continuous monitoring of the tank is possible with such an instrument, which is switched on at such times as no removal is taking place from the tank. If the tank contains, for example, fuel oil, then during the operation of the burner oil is removed, and during this time the device is out of service. So long as the burner is in operation, all the valves 64, 66, 67 are open. On both sides of the diaphragm 68, atmospheric pressure then prevails and the level in the tubes E and M can adjust to the level in the tank. If no removal takes place, the valves 64, 66, 67 shut. If now in consequence of a leak the level in the tank falls from $N_1$ to $N_2$, then the level in the measuring tube also drops to the level $N_2$, while the level in the calibration tube E is maintained at $N_1$. The air-space at the top of tube M has consequently increased, i.e. the pressure has dropped. This lower pressure now prevails also on the lower side of the diaphragm 68, because this part of the casing is of course in connection by means of pipeline 62 with the upper end of the measuring tube. Consequently the diaphragm 68 is deflected downwards, the contact 69 closes and an alarm is set off.

By way of embodiment, further variants are possible; an instrument according to FIGURES 3a to c can be provided with a remote indicating-device, known per se, or only with an automatic warning-device. A simple warning-device may be easily realized in an instrument according to FIGURES 3a to c if, for example, on disc 52 a permanent magnet is fixed and on disc 53 a "Reed" ampoule. If no leak is present, the discs move pari passu, only when a leak arises do they shift in relation to one another and a warning signal is given. Further, in the embodiment according to FIGURES 3a to c, the valve 40 can be remotely controlled, so that it opens automatically during removal; for example, during the operation of an oil-burner which is fed from the tank. In the intermediate standstill periods, on the contrary, the valve is closed and a leak-indication is always ensured. Such an installation is best combined with a remote indicator or at least with a warning device. Finally it may be observed that in such check devices, permanently fitted in the tank, the tubes E and M must reach nearly to the bottom of the tank, so that the installation indicates correctly until the emptying of the tank.

For very large and deep tanks, a portable instrument as shown in FIGURE 2 is no longer useful. A large tank can be up to 30 m. deep and such an instrument would have to be made much too big and would then be no longer manageable. In FIGURES 5 to 9, a portable instrument is represented which works on the same principle as described in FIGURE 1 and yet is suitable for leak-checking in very large tanks. In this instrument, instead of tubes, hoses connected together are used. These can be wound on a hose-reel, easily transported and, during measurement, unwound as necessary. FIGURE 5 shows such a hose-reel 70 with a carrier-frame 71. On the drum, a hose 72 is wound; at the lower end thereof the valves are contained in a casing 73. The hose can be constructed in various ways, for example as shown in FIGURES 6 and 7. These figures show a transparent plastic hose in section and in external appearance. The hose contains four channels: one channel E forming the calibration tube, one channel M forming the measuring tube and two control channels $S_1$ and $S_2$. The valves accommodated below in the valve-casing 73 must, that is, be capable of being operated from the upper end of the hose. Since actuation is completed in one single closing, a simple solution is here possible. Each valve has its own power-storage in the form of a spring, which is tensioned by hand before the putting into service of the instrument. For closing the valve, it is then only necessary to release a pawl, and a spring closes the valve. The releasing of a pawl, however, needs only slight energy and this may be supplied pneumatically through the control-channels $S_1$ and $S_2$. For actuating the valves, the upper ends of the hose sections $S_1$, $S_2$ are connected to actuating members, which each contain a rubber bellows, 75 or 76. If this is pressed on, a corresponding valve is closed by releasing the pawl.

FIGURE 8 shows such a valve-block in section. In this figure, 80 is a casing with a valve-plate 81, to which the hoses E and M and also the control-channels $S_1$ and $S_2$ are connected above. Below the plate are valve-discs 82, power-storage springs 83 and draw-knobs 84, connected to the valve-discs. The springs 83 enclose centrally a valve-stem 85. On this is a stop-collar 86 which can be held by a pawl 87. The pawl 87 can be actuated by means of a piston 89, movable in a cylinder 88 against the thrust of spring 90. 91 and 92 are openings in the casing, through which fluid can penetrate into the casing and into the hoses E and M, when the valves are opened. In the drawing is represented the state of the valves during a leak-check. The left valve, which is connected with the calibration hose E, is already closed, the right valve is still open and its power-storage spring 83 is compressed. At the end of the measurement, the bellows 76 (FIGURE 5) is operated, thereby pressure comes on the line $S_2$, the right piston 89 moves downwards and releases the pawl 87. The right valve thereupon closes by the action of the power-storage spring 83. Before the measurement and before the insertion of the valve-casing 73 into the tank, both power-storage springs are compressed by hand, by pulling on the knobs 84. The valve-casing is deliberately made heavy so that the hose hangs as vertically as possible in the tank.

FIGURE 9 shows the instrument during the leak-check, wherein it stands on top of a large tank. The method of operation with this instrument is briefly as follows:

(1) Unroll the hose and insert the deliberately heavily constructed valve-casing with the valves open, i.e. with compressed power-storage springs, into the tank until the valve-casing is deeply immersed in the fluid.

(2) Fix the hose in this position so that it cannot sink during the measurement. For this purpose, either a hose-clamp can be used or the drum 70 itself is fixed in the holder 71.

(3) By means of the bellows 75, the valve belonging to the calibration channel is closed.

(4) During the checking period, one leaves the instruments undisturbed and takes care that no fluid is withdrawn from the tank.

(5) After the lapse of the checking time, the valve belonging to the measuring channel is also closed, by means of bellows 76.

(6) The hose can now be raised by winding up on the drum 70 and it can be determined whether there is a difference of level in the channels E and M. This may be easily determined because, of course, the hose is made of transparent plastic. A difference of level indicates a leak.

I claim:

1. In a device for detecting leakage of liquid from a vessel containing liquid by detecting a fall in the liquid level in the vessel over a period of time in which liquid is neither added to nor withdrawn from the vessel: the improvement that the device comprises two tubes rigidly connected together in a parallel arrangement and adapted to extend in an essentially vertical position into the liquid in the vessel, the tubes having upper and lower ends, both of the tubes having means connecting their upper ends with the atmosphere to enable the liquid levels in the tubes to coincide mutually and with the liquid level in the vessel, means for closing the lower end of one of the tubes whereby the level in that one tube may be fixed and used as a thermally compensated standard of comparison for the level in the other tube, and means for determining at any time the level of liquid in the other tube whereby level falls arising from thermal contraction are distinguished from level falls due to leakage.

2. A device as claimed in claim 1, for use as a portable leakage detector to be located in the vessel for the duration of a test and then removed, the device having the further improvement that it comprises a collar adjustable with respect to the tubes and adapted to locate the tubes longitudinally with respect to the vessel, and means for closing the other of the said tubes whereby the level therein at the conclusion of a test may be retained and the device withdrawn from the vessel for inspection and comparison of the two vessels.

3. A device as claimed in claim 2, in which the tubes are at least partially formed of transparent material for visual inspection of the levels therein.

4. A device as claimed in claim 3, for use within deep vessels, in which the tubes are formed by conjoined transparent hoses, and comprising a reel on which the hoses may be reeled.

5. A device as claimed in claim 4, comprising valve means for closing the lower ends of the hoses and remotely controlled pneumatic actuating means for the said valves.

6. A device as claimed in claim 5, comprising pneumatic hoses for carrying air to the valve means, the said pneumatic hoses being solubly connected to the said two transparent hoses.

7. A device as claimed in claim 6, comprising energy storage means associated with said valve for operating the same and pneumatic means for releasing the energy-storage means to operate the valve.

8. A device as claimed in claim 1 for use as a permanently installed leakage detector, wherein only one of the said two tubes is provided with closing means in the form of a valve at the lower end thereof, and comprising a float in each of the two tubes and indicating means for detecting and comparing the levels of the floats.

9. A device as claimed in claim 8, wherein the valve at the lower end of the said one tube is remotely operable and is adapted to be operated automatically to open position while liquid is being withdrawn from the vessel.

10. A device as claimed in claim 1 for use as a permanently installed leakage detector, wherein only one of the said two tubes is provided with closing means in the form of a valve at the lower end thereof, and comprising a diaphragm capsule and conduits connecting the upper ends of the two tubes to the diaphragm capsule, the said conduits including valves to vent the conduits to atmosphere and closable during a test period whereby a change in the level in the said other tube is detectable by the diaphragm capsule.

11. A device as claimed in claim 10, wherein the valve at the lower end of the said one tube is remotely operable and is adapted to be operated automatically to open position while liquid is being withdrawn from the vessel.

References Cited

UNITED STATES PATENTS

| | | |
|---|---|---|
| 1,467,853 | 9/1923 | Heinold. |
| 1,958,272 | 5/1934 | Hubbell. |
| 2,302,884 | 11/1942 | O'Neill _____ 73—425.4 |
| 3,371,538 | 3/1968 | Bagby _____ 73—425.4 |

LOUIS R. PRINCE, Primary Examiner

D. O. WOODIEL, Assistant Examiner

U.S. Cl. X.R.

33—126; 73—299, 311, 321